(12) United States Patent
Chong et al.

(10) Patent No.: US 9,735,630 B2
(45) Date of Patent: Aug. 15, 2017

(54) COOLING ARRANGEMENT FOR AN ELECTRICAL MACHINE

(71) Applicant: ROLLS-ROYCE PLC, London (GB)

(72) Inventors: Ellis Fui Hen Chong, Derby (GB); Geraint Wyn Jewell, Sheffield (GB); Leon Kevin Rodrigues, Sheffield (GB)

(73) Assignee: ROLLS-ROYCE plc, London (GB)

( * ) Notice: Subject to any disclaimer, the term of this patent is extended or adjusted under 35 U.S.C. 154(b) by 190 days.

(21) Appl. No.: 14/372,602

(22) PCT Filed: Jan. 31, 2013

(86) PCT No.: PCT/EP2013/051908
§ 371 (c)(1),
(2) Date: Jul. 16, 2014

(87) PCT Pub. No.: WO2013/117481
PCT Pub. Date: Aug. 15, 2013

(65) Prior Publication Data
US 2014/0361649 A1    Dec. 11, 2014

(30) Foreign Application Priority Data
Feb. 10, 2012 (GB) .................................. 1202300.8

(51) Int. Cl.
*H02K 1/20* (2006.01)
*H02K 1/18* (2006.01)
(Continued)

(52) U.S. Cl.
CPC ............... *H02K 1/20* (2013.01); *H02K 1/185* (2013.01); *H02K 9/22* (2013.01); *H02K 5/20* (2013.01)

(58) Field of Classification Search
CPC .. H02K 1/20; H02K 5/20; H02K 9/22; H02K 1/12; H02K 1/18
(Continued)

(56) References Cited

U.S. PATENT DOCUMENTS 1,882,487 A * 10/1932 Dupont .................... H02K 1/16
  310/216.011
4,208,597 A * 6/1980 Mulach .................... H02K 1/20
  174/DIG. 20
(Continued)

FOREIGN PATENT DOCUMENTS

DE    199 43 444 A1    3/2001
GB        627446       8/1949
(Continued)

OTHER PUBLICATIONS

British Search Report issued in British Patent Application No. GB1202300.8 on May 31, 2012.
(Continued)

*Primary Examiner* — Hanh Nguyen
*Assistant Examiner* — Leda Pham
(74) *Attorney, Agent, or Firm* — Oliff PLC

(57) ABSTRACT

This invention relates to a laminated core for an electrical machine, including: a plurality of laminations configured to define a channel in a surface of the laminated core for the flow of a cooling fluid, wherein the channel has a base and at least one side wall, the at least one side wall having a stepped profile.

17 Claims, 5 Drawing Sheets

(51) Int. Cl.
*H02K 9/22* (2006.01)
*H02K 5/20* (2006.01)

(58) Field of Classification Search
USPC .................................. 310/216.01–216.137
See application file for complete search history.

(56) References Cited

U.S. PATENT DOCUMENTS

| | | | | | |
|---|---|---|---|---|---|
| 5,173,629 | A | * | 12/1992 | Peters | ............ H02K 1/20 310/216.014 |
| 5,331,238 | A | * | 7/1994 | Johnsen | ............ H02K 1/185 310/216.049 |
| 2004/0012294 | A1 | | 1/2004 | Rippel et al. | |
| 2006/0284511 | A1 | | 12/2006 | Evon et al. | |
| 2007/0013241 | A1 | | 1/2007 | Schiferl et al. | |

FOREIGN PATENT DOCUMENTS

| | | |
|---|---|---|
| GB | 2 001 481 A | 1/1979 |
| JP | A-11-18334 | 1/1999 |
| JP | A-2001-333559 | 11/2001 |
| JP | A-2006-33916 | 2/2006 |
| WO | WO 2012/047485 A2 | 4/2012 |

OTHER PUBLICATIONS

International Search Report issued in International Application No. PCT/EP2013/051908 on May 26, 2014.
Written Opinion of the International Searching Authority issued in International Application No. PCT/EP2013/051908 on May 26, 2014.

\* cited by examiner

COOLING ARRANGEMENT FOR AN ELECTRICAL MACHINE

TECHNICAL FIELD OF INVENTION

This invention relates to the cooling of electrical machines having a laminated core. In particular, though not exclusively, this invention relates to rotary electrical machines.

BACKGROUND OF INVENTION

It is well known that electrical machines require cooling to remove thermal energy which is generated in use. There are many electrical machines in which the only means of removing the power losses from coils and stator cores is via the back of the stator, usually into the main structural casing of the machine. Typically, such cooling methods include passing a fluid (i.e. a gas or liquid) coolant into the casing, such as a water jacket casing, or a void in the stator.

Regardless of the method used, the surface to volume ratio is an important factor in determining the level of cooling which is available and can become a limiting factor for the power density of the machine. This is particularly the case for machines in which casing materials with modest thermal conductivities, e.g. titanium, need to be used.

Hence, there exists a need to provide an effective way of removing heat from the core of a stator.

This general problem has been addressed in the prior art. For example, U.S. Pat. No. 5,331,238 describes a core retained within a housing in which a cooling fluid is supplied axially along an axis of the core between the housing and the core in order to cool the core. The core is described as having core laminations provided with cooling fins, and the core laminations may be rotated with respect to adjacent core laminations so that the cooling fins provide a cascaded cooling passage for the flow of the cooling fluid. A containment/growth sleeve is described as being inserted within or around the housing to minimize thermal deflection of the housing with respect to the core. Fluid conduits are provided in the housing which cooperate with the cascaded cooling passages.

GB2001481A describes an air-cooled electromotor having a stator including a plurality of laminations of non-circular external contour. The laminations are mutually offset in the direction of rotation of the rotor of the electromotor so that corners or projections of the laminations are exposed to cooling air and act as cooling fins for the stator.

US2007013241A describes a motor having a stator core disposed in a motor frame. The stator core is formed from a plurality of substantially identical laminations. Each lamination of the stator core comprises at least one recessed section, which, in cooperation with the frame, defines an incremental segment of closed passageway for routing a fluid along a perimetric surface of the stator core. Accordingly, the closed passageway provides a mechanism by which the outer regions of the stator core may be more effectively cooled. Furthermore, the laminations of the stator core may be oriented at varied orientations with respect to one another to form a labyrinthine path along the surface of the stator core through which coolant is routed.

U.S. Pat. No. 4,208,597 describes an arrangement for providing improved cooling for the end regions of the stator core of a large dynamoelectric machine in which a solid rigid vent plate is placed in contact with the finger plate at each end of the core. The vent plates are non-magnetic plates of the same configuration as the core laminations and have radial grooves in at least one surface. Coolant gas flows through the grooves to directly cool the finger plate and the end laminations of the stator core.

US2006284511 describes a motor having enhanced cooling. The exemplary motor includes a stator core formed from a plurality of stator laminations and a peripheral surface of the motor. Each stator lamination has a plurality of fins that extend radially outward. When assembled, the fins of adjacent laminations cooperate to form larger fins extending the length of the stator core. These fins enhance the cooling of the motor, by improving heat dissipation of the motor.

US2004012294A describes an electric motor, transformer or inductor having a lamination cooling system comprising a stack of laminations, each defining a plurality of apertures at least partially coincident with apertures of adjacent laminations. The apertures define a plurality of cooling-fluid passageways through the lamination stack, and gaps between the adjacent laminations are sealed to prevent a liquid cooling fluid in the passageways from escaping between the laminations. The gaps are described as being sealed by injecting a heat-cured sealant into the passageways, expelling excess sealant, and heat-curing the lamination stack. The apertures of each lamination can be coincident with the same-sized apertures of adjacent laminations to form straight passageways, or they can vary in size, shape and/or position to form non-axial passageways, angled passageways, bidirectional passageways, and manifold sections of passageways that connect a plurality of different passageway sections. Manifold members adjoin opposite ends of the lamination stack, and each is configured with one or more cavities to act as a manifold to adjacent passageway ends. Complex manifold arrangements can create bidirectional flow in a variety of patterns.

The present invention provides an improved arrangement for cooling a laminated stator of an electrical machine.

STATEMENTS OF INVENTION

In a first aspect, the present invention provides a laminated core for an electrical machine, comprising: a plurality of laminations configured to define a channel in a surface of the laminated core for the flow of a cooling fluid, wherein the channel has a base and at least one side wall, the at least one side wall having a stepped profile.

The channel may include an imaginary axis extending from the base into the channel and the width of the channel may increase along the length of the axis due to the stepped side wall.

The laminations may include at least one circumferential projection which subtends about an angle. The change from one circumferential projection to an adjacent circumferential projection may be defined by a step. Each circumferential projection may extend about an angle alpha or multiple thereof. Each lamination may include an inner projection and an outer projection and at least two intermediate projections therebetween. The projections may be curved or may be straight.

The step of the stepped profile may be formed by an edge of a lamination.

The laminations may be at least partially circular and an edge of the lamination may have multiple radiuses of curvature.

The change from one radius of curvature to an adjacent radius of curvature may be defined by a step.

Each radius of curvature may extend about an angle alpha or multiple thereof.

Each lamination may include an inner radius of curvature and an outer radius of curvature and at least two intermediate radiuses of curvature therebetween.

The laminations may have at least two fold rotational symmetry.

The circumferential channels may be formed by a plurality of identical laminations and adjacent laminations are rotationally offset to one another.

The rotational offset between adjacent laminations is between 15 degrees and 90 degrees. It will be appreciated that minor variations to these angles may be accepted whilst fulfilling the purpose of the rotational offset.

The laminated core may be generally cylindrical and the channels extend around the circumference of the laminated core between an inlet and an outlet so as to provide parallel circumferential flow paths for a coolant when in use. In other embodiments, the laminations may be polygonal. For example, the laminations may have multiple flat sides. The laminations may be generally square. The outer circumferential edge of the lamination may have a saw tooth profile.

The plurality of circumferential channels may be sections of a helical channel.

The outer surface may include two or more helical channels.

The inlets may be arranged along a common axis. The common axis may be straight. The common axis may extend across multiple turns of the helical channel.

The laminated laminations may be substantially polygonal. The projections may straight along the circumference. The projections may define the chord of an arc which extends between adjacent projections.

The helical channels may be intertwined. That is the turns of each helical coil may be separated by one or more turns of one or more other helical turns. By helical channel it will be understood that the channel that the longitudinal axis of the channel is substantially helical. However, in some embodiments, the channels follow a stepped or staggered helical path. The helical channel may comprise polygonal sections wherein arcuate lengths of the helical channel are generally straight. For example, the laminated core may generally be an elongate hexagonal shape or cuboidal.

The inlets of each circumferential channel may be arranged along a common axis. The common axis may be straight. The common axis may extend across multiple turns of the helical channel.

The laminated core may comprise a housing. The housing may have a surface which forms part of the channels.

The housing may include at least one aperture which traverses several channels so as to provide the inlet for each channel.

The channels may be in fluid communication with each other.

In another aspect, there is provided a rotary electrical machine, comprising: a laminated core having a plurality of laminations, the laminations defining a plurality of parallel circumferential channels in a surface of the laminated core for a flow of cooling fluid, wherein the plurality of circumferential channels each extend between an inlet and an outlet so as to provide a plurality of parallel circumferential flows of coolant when in use.

Having a plurality of parallel circumferential flow paths allows shorter cooling paths to be created around the machine with an improved cooling affect. Further, the cooling may be more homogeneously distributed.

The channel may be open sided. The open side may be on the outer circumferential surface of the laminated core. The open sided channel may be generally closed with a wall of the housing. The closed channel may or may not be fluid tight so as to define a conduit.

The inlets may be defined by one or more apertures. The apertures may be in a wall of a housing. Alternatively, the one or more apertures may be in discrete member or part of a manifold.

The plurality of circumferential channels may be sections of a helical channel. The outer surface of the laminated core may have a helical channel therein. The helical channel may include a plurality of turns. Each channel may be between one lamination and ten laminations wide. A plurality of inlets may be arranged along the helical channel, thereby dividing the channel into a plurality of circumferential channels.

The outer surface may include two or more helical channels. The helical channels may be intertwined. That is, the turns of each helical coil may be separated by one or more turns of the one or more other helical turns. By helical channel it will be understood that the channel that the longitudinal axis of the channel is substantially helical. However, in some embodiments, the channel follow a stepped or staggered helical path.

The inlets of each circumferential channel may be arranged along the axial length of the rotary machine. The inlets may be arranged along a common axis. The common axis may be straight. The common axis may extend across multiple turns of the helical channel.

The rotary machine may further comprise a housing. The housing may have a surface which forms part of the circumferential channels. The housing may include at least one aperture which traverses several circumferential channels so as to provide the inlet for each channel. The aperture may be elongate. The aperture may extend along the axial length of the housing. The aperture may run parallel to the principal axis of the rotary machine.

The channels may be in fluid communication with each other. The fluid communication may be via interconnecting passageways. The passageways may be in the housing. The passageways may be grooves. Alternatively, the passageways may be in a lamination. The passageways may be notches or apertures in the laminations.

The laminations may include at least one circumferential projection which subtends about an angle. The change from one circumferential projection to an adjacent circumferential projection may be defined by a step. Each circumferential projection may extend about an angle alpha or multiple thereof. Each lamination may include an inner projection and an outer projection and at least two intermediate projections therebetween. The projections may be curved or may be straight.

The channel may be defined by the laminations of the laminated core. The laminations may have multiple radiuses of curvature. The laminations may be assembled such that the multiple radiuses of curvature combine to form the circumferential channels. The laminations may be assembled such that the multiple radiuses define the helical channel.

The change from one radius of curvature to an adjacent radius of curvature may be defined by a step. The base may be one or more laminations wide. The sidewalls may include one or more steps. The steps may be provided by an edge of a lamination. That is, the laminations which define a channel in an imaginary cross-sectional plane may be different heights. The width of the side wall which separate two circumferential channels may be a single lamination wide.

The circumferential channels may each have a base and at least one side wall. The at least one side wall may have a stepped profile. The stepped profile may be formed by an edge of a lamination. The side wall may comprise portions of a plurality of laminations. The number of laminations which define the sidewall in a given cross-section which is orthogonal with respect to the longitudinal axis of the channel may be between one and six. Each lamination may include an inner radius of curvature and an outer radius of curvature. There may be at least two intermediate radiuses of curvature therebetween.

Each radius of curvature may extend about an angle alpha or multiple thereof. The angle alpha may be between 15 degrees and 90 degrees. In one advantageous embodiment, alpha is 30 degrees.

The laminations may have reflected or rotational symmetry. The laminations may have at least two fold rotational symmetry.

The circumferential channel may be formed by a plurality of identical laminations. The identical laminations may be assembled such that adjacent laminations are rotationally offset to one another. The angle of rotational offset may be alpha degrees or a multiple thereof.

Embodiments of the invention are now described with the aid of drawings.

DETAILED DESCRIPTION OF INVENTION

Figure 1:
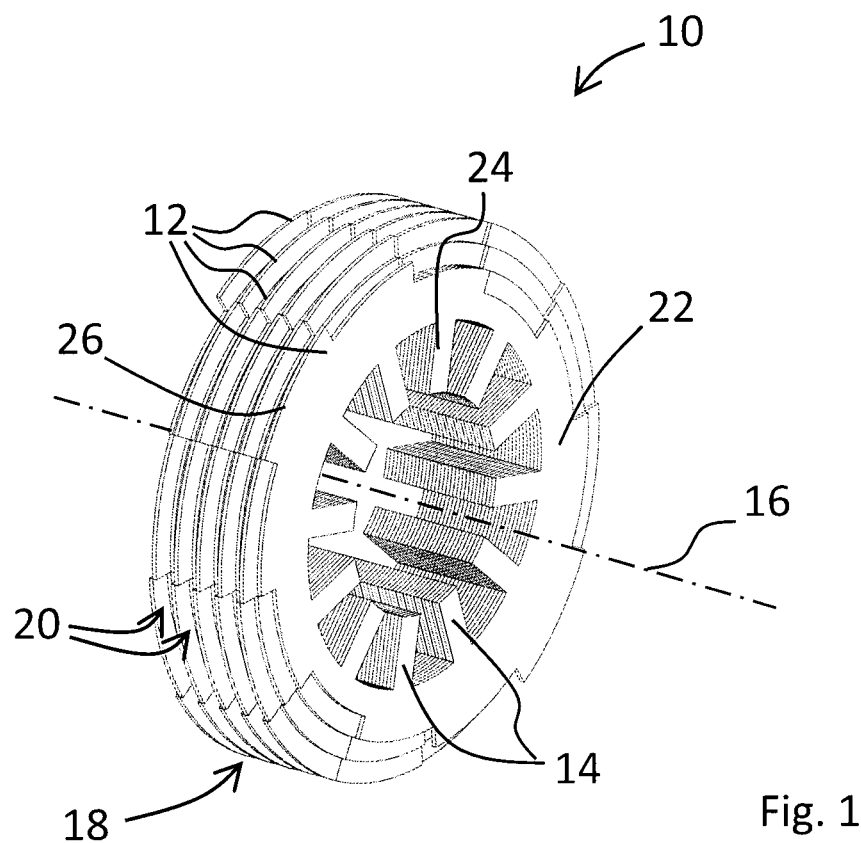
FIG. 1 shows a laminated core for a rotary electrical machine.

FIG. 1 shows a laminated core 10 which in the present embodiment is that of a switched reluctance machine. The laminated core 10 includes a stack of laminations 12 which is located within the housing 210 shown in FIG. 2. Laminated cores 10 are generally well known in the art and generally have a high relative magnetic permeability for providing a magnetic flux guide. The laminations 12 are electrical insulated from one another so as to help reduce parasitic eddy currents which would otherwise result when the core is used in an alternating magnetic flux field.

As will be appreciated, in use the laminated core 10 would include electrical windings around each of the salient pole pieces 14 and a rotor rotatably mounted within the laminated core 10 so as to be coaxial with the principal axis of the core 16. In use, appropriate electromagnetic interaction between the windings and rotor would result in the electrical machine being used as a motor or generator as well known in the art. Although the example of a switched reluctance machine is used in the description of the broad inventive concept, it will be appreciated that the invention may be utilised on other electrical machines, rotary or otherwise.

The outer surface 18 of the laminated core is generally cylindrical and includes two congruent helical channels 20 which extend from one end of the core 10 to the other and which are axially offset from one another so as to be intertwinned with the turns of a first helical channel sitting within the turns of the other.

The outside circumferential dimension of the laminated core 10 is sized so as to be snugly received within a housing 210. Hence, the housing 210 has an appropriately sized cylindrical passage there through. When within the housing 210, the inner surface of the housing 214 and helical channel 20 form a conduit for receiving a fluid flow from an inlet to an outlet in the housing 210. Passing a cooling fluid, such as air through the conduit acts to remove heat from the core which is generated in use.

Figure 2:
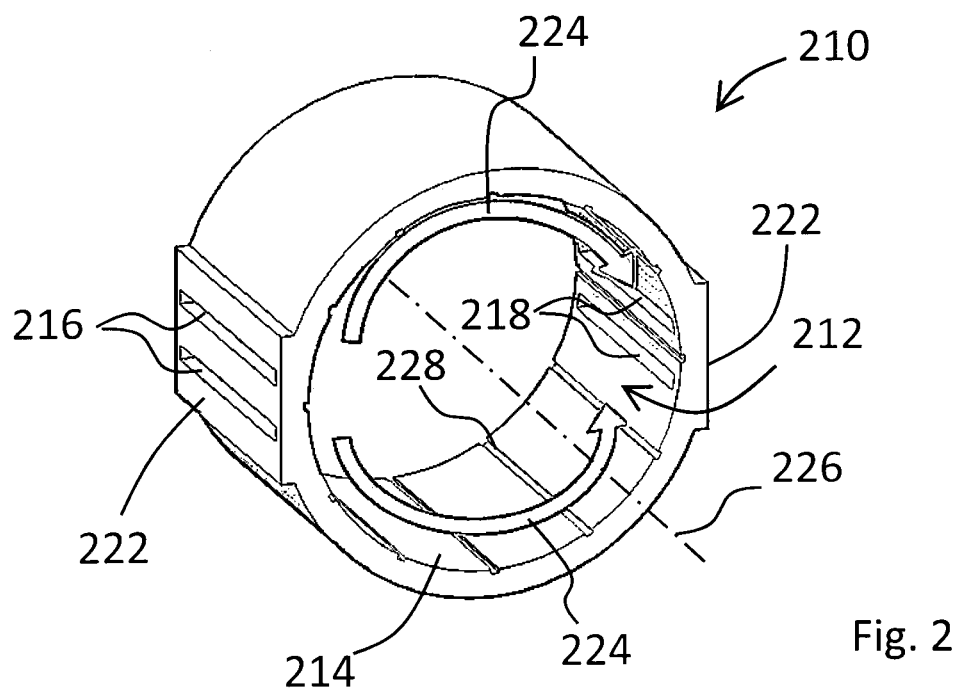
FIG. 2 shows a housing for receiving the laminated core of FIG. 1.

The housing shown in FIG. 2 includes a pair of inlets 216 and a corresponding pair of outlets 218 on the circumferentially opposing sides of the passageway in which the laminated core 10 would be situated. The inlets 216 and outlets 218 are mirrored about an imaginary plane which passes horizontally through the principal access 226 of the machine, perpendicularly to opposing mounting plate surfaces 224. The inlets 216 and outlets 218 are in the form of elongate apertures which pass through the housing wall 220 perpendicular to the mounting plate surface 222 which is integrally formed with the housing 210.

The apertures extend along the axial length of the housing 210 such that they pass over a plurality of turns of the helical channels 20. In this way, there is provided an inlet and an outlet for each approximate half turn of the helical channels 20 thereby creating a plurality of parallel circumferential channels. Hence, when air is passed through the inlets 216 under pressure, a plurality of circumferential flows is set up around the outer surface of the laminated core 10 between the inlet and outlets, as indicated by arrows 224.

Having a plurality of flows in this way allows for a better control of cooling air flows and a more homogeneous distribution of cooling.

Air may be delivered to the inlets via any appropriate attachment which is coupled to source of cooling fluid. This may include any application specific gas or fluid but will typically be compressed air. Hence, the mounting plates 222 are adapted to receive a manifold 610 such as that shown in FIG. 6, and therefore include appropriate fixings such as threaded bores or studs (which are not shown).

The housing includes longitudinal grooves 228 which extend along the inner surface 214 of the housing parallel to the principal axis 226 of the machine. These grooves are configured to snugly receive projections, or keys, located on the outer edge of the laminations. Thus, the key and groove combination provides an interlock which prevents rotation of the laminations.

A further use of the grooves may be to allow air to pass from one channel 20 into the next so as to homogenise the flow in the channels which may be different in each channel due to machining tolerances or the like. It will be appreciated, that additional grooves may be included to serve the purpose of homogenising the airflow and that these grooves may be larger or more numerous than the ones shown in the Figures.

The laminated core 10 is made up from a stack of laminations 12 (or lamina) in the form of plates of material having a high relative magnetic permeability. Each lamination 12 has two facing surfaces 22 (of which only one can be seen) each of which abut adjacent laminations 12 in the stack, and radially inner 24 and outer edges 26. In the described embodiment, the radially inner edge 24 of the lamination is profiled so as to provide twelve salient pole pieces 14 when placed in the stack, each one receiving a winding in use, as described above.

The radially outer edge 26 of each lamination has a stepped profile in which there are arcuate sections 28a, b, c, of the lamination having different radiuses of curvature. The stepped profile is such that it provides the two intertwined helixes 20 on the outer surface 18 of the laminated core. Generally, the laminations in a stack are identical and are such that rotating each lamination 12 relative to the adjacent lamination 12 during assembly of the core 10 results in the creation of the helical channels 20, as described in more detail below.

Figure 3A:
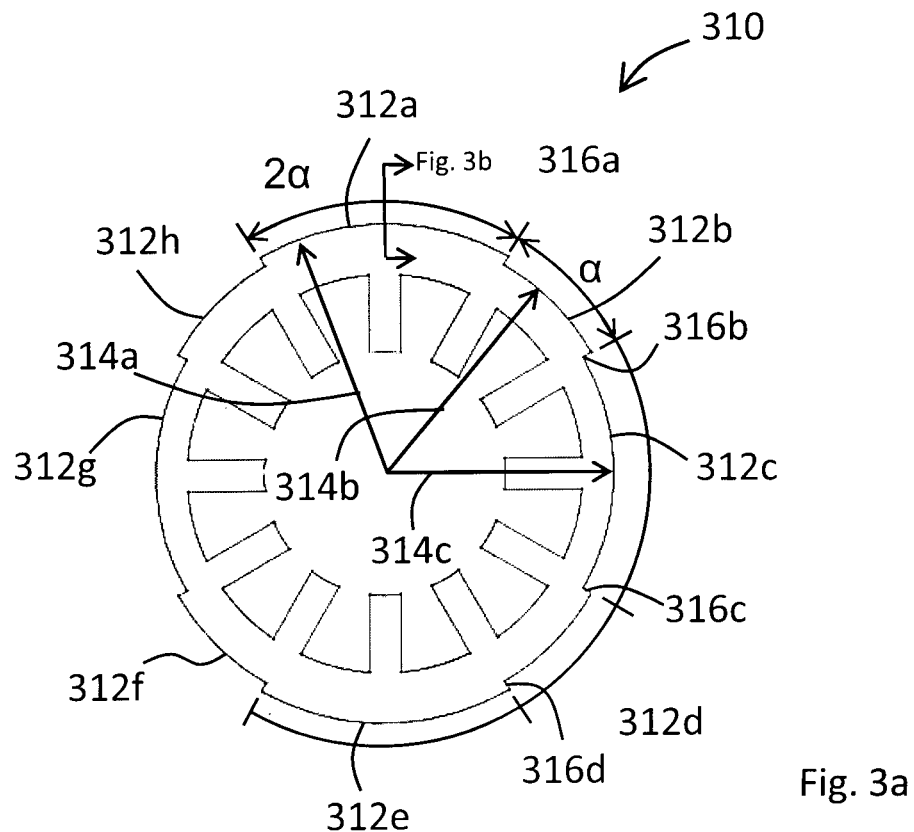
FIG. 3a shows a lamination from a laminated core.

In the lamination 310 shown in FIG. 3a there are eight arcuate sections 312a-h having alternating lengths of α degrees and 2α degrees, and three different radiuses of curvature 314a-c distributed around the circumference of the lamination 310. Hence, at the uppermost portion of the lamination there is a first arcuate section 312a which subtends 2α degrees and has radius of curvature which defines the outer radius of the lamination 310 and laminated core. At either end of the first arcuate section, there is a step 316a in the radially outer edge of the lamination 310 so as to provide a second arcuate section 312b having a second radius of curvature 314b. The second radius of curvature 314b extends through an angle α until a further step 316b reduces the radius of curvature to a third radius 314c which represents the innermost radius. The inner radius 314c extends for 2α until the next step 316c which extends radially outwards to match the radius of curvature in the second step. A fourth step 316d returns the radius of curvature to the outer diameter of the laminated core 10. This pattern is repeated around the circumference of the lamination 310 so as to have two degrees of mirror symmetry and two fold, or 180 degree, rotational symmetry.

Another way to describe the arrangement of stepped arcuate sections would be to state that the outer edge of the laminations includes a circumferential series of radially extending projections and that, in the case of the described embodiment, the projections are stepped.

It will be apparent to the skilled person that the projections or different arcuate lengths of curvature may not be defined by steps but may be defined by a sweeping change in the outer dimension of the lamination between the outermost radius of the core and the inner most radius of the core.

Figure 3B:
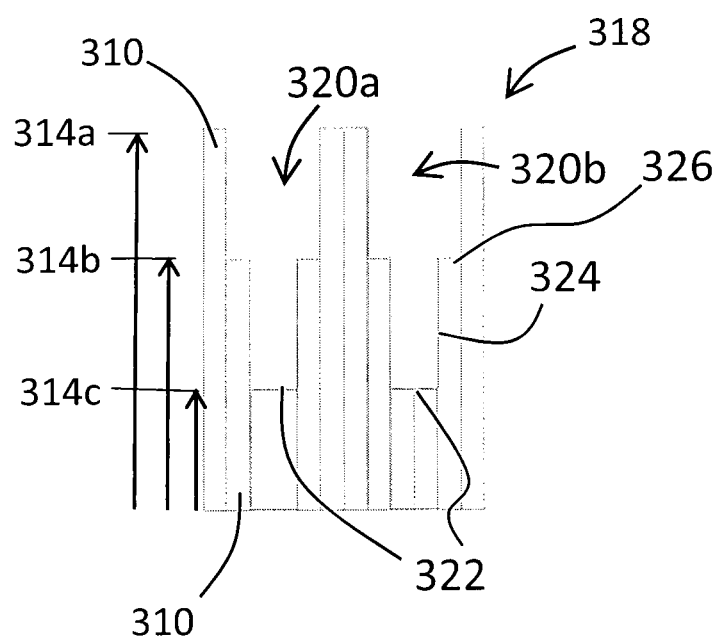
FIG. 3b shows a cross section of a channel located in the outer surface of a laminated core constructed from the laminations in FIG. 3.

As shown in FIG. 3b, the laminations 310 are placed together coaxially in a stack 318 with each successive lamination 310 being rotated by alpha degrees. Hence, the outer radius 314a of one lamination is partially adjacent to an outer radius 314a of the adjacent laminations on either side and partially adjacent to the second 314b or intermediate radius of curvature. In this way two helical channels 20 are created across the laminated core. which shows a stack 318 of twelve laminations 310 defining two adjacent turns of intertwined channels 320a, 320b, each having a base 322 two laminations wide and an outer radius 324 two laminations wide. Each sidewall 324 of the channels 320a, 320b have a stepped profile in which the edge of the arcuate section of lamination having the intermediate radius of curvature provides the step 326.

This arrangement is particularly advantageous as it allows the cooled surface area of the laminations 310 to be increased whilst providing support from adjacent laminations so as to maintain strength and rigidity in each of the lamination cooling fins created by the stepped profile. Further, the stepped profile of the laminations is particularly advantageous as it provides for a stack or core made from similarly shaped laminations 310 which are rotated relative to one another during fabrication of the core, thereby allowing for a simpler design and manufacturing tooling requirements.

As will be appreciated, the number of steps in the outer edge of the laminations can be altered to provide channels having a desired width, depth and number. Hence, for example, having a lamination with three-fold rotational symmetry may result in three, relatively narrow, helical channels. Having no rotational symmetry, but one degree of mirror symmetry, may result in a single, wider helix on the outer surface of the laminated core. Other combinations will be apparent to the skilled person such that the pitch, depth and width of the channels can be tailored according to a specific application.

Figure 4:
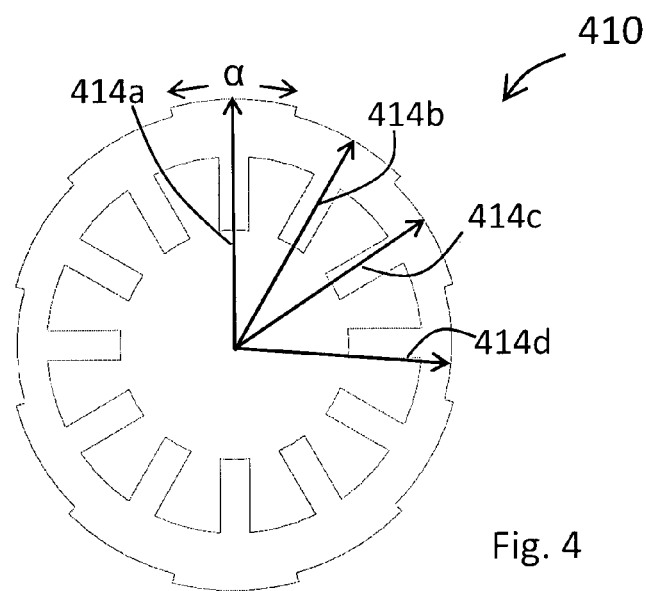
FIG. 4 shows an alternative lamination.

FIG. 4 shows a preferred lamination 410 having four radiuses of curvature 414a-d and twelve equal arcuate lengths of alpha degrees, where alpha is equals 30 degrees. This is the lamination which is used in the laminated core depicted in FIG. 1. Hence, with this particular lamination 410, the radius of curvature for adjacent laminations in the stack is different and the outer radius of curvature is only ever one lamination wide (presuming that each lamination is rotated relative to its adjacent laminations).

Figures 5A, 5B:
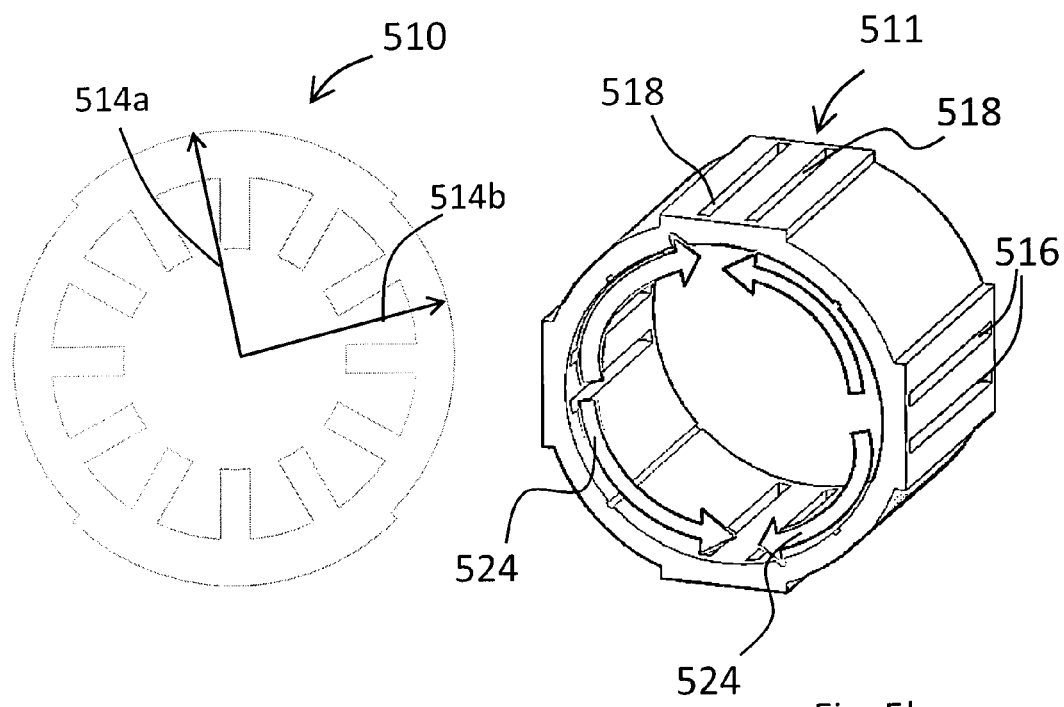
FIGS. 5a and 5b show an alternative lamination and housing.

A further lamination 510 and housing 511 is shown in FIG. 5. Here the lamination 510 includes two radiuses of curvature 514a, 514b which provides arcuate sections which extend over equal lengths of alpha, where alpha equals 90 degrees. These laminations 510 can be assembled such that adjacent laminations are rotated through 90 degrees. This results in a plurality of, non-helical, circumferential channels which do not overlap and are thus substantially fluidly isolated from one another within the bounds of the laminated core. This arrangement requires an alternative design of housing to provide each channel with an inlet and an outlet, wherein each inlet and outlet pair are angularly separated by less than alpha, which in this case is 90 degrees. As can be seen, the outlets and inlets are advantageously grouped in adjacent pairs comprising one from each inlet-outlet pair. In this way, the connection of manifolds and the like to provide the pressurised air can be made simpler and the number of manifolds reduced. In the embodiment shown in FIGS. 5a and 5b, there are four circumferential flows as indicated by arrows 524. However, it will be appreciated that the angle alpha in the laminations could be reduced, to provide shorter airflow paths and more homogenous cooling.

Figure 6:
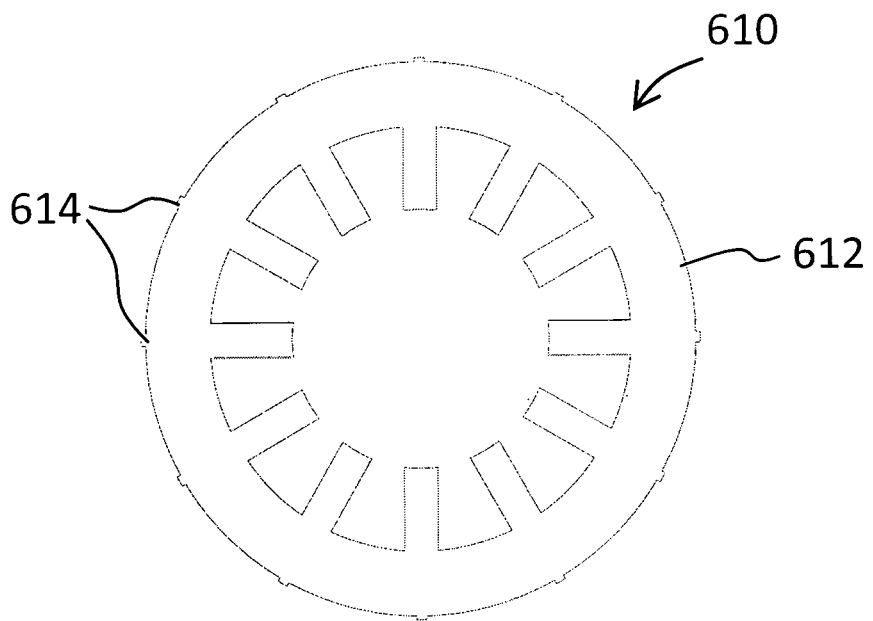
FIG. 6 shows an end plate lamination.

FIG. 6 shows an end lamination 610 which acts to seal the end of the helical channels which would otherwise be present at the end of the laminated stacks. Thus, the lamination 610 has a continuous outer radius of curvature 612 with the exception of the projections 614 which are placed to block the axial grooves 228 shown in the housing of FIG. 2.

Figure 7:
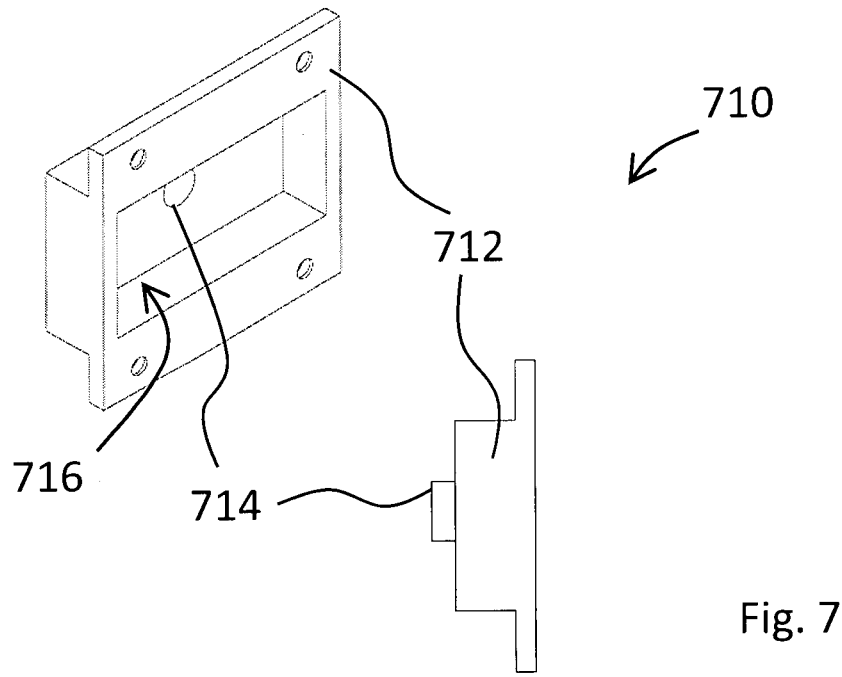
FIG. 7 shows a perspective and end view of a manifold for connecting the housing to a source of pressurised coolant.

FIG. 7 shows a perspective view and end view of a manifold 710 which is adapted to be mounted to a mounting plate 222 provided on the outside of the housing 210 as described above in relation to FIG. 2. Hence, there is a generally provided an open sided structure 712 to which a source of pressurised coolant is attached via coupling 714. The open side 716 of the housing 710 is mounted to the mounting plate 222 so as to envelope the inlets 216 (and outlets 218 where applicable) and flood them with coolant which flows into the internal chamber of the manifold 710 and around the laminated core as described above.

Figure 8:
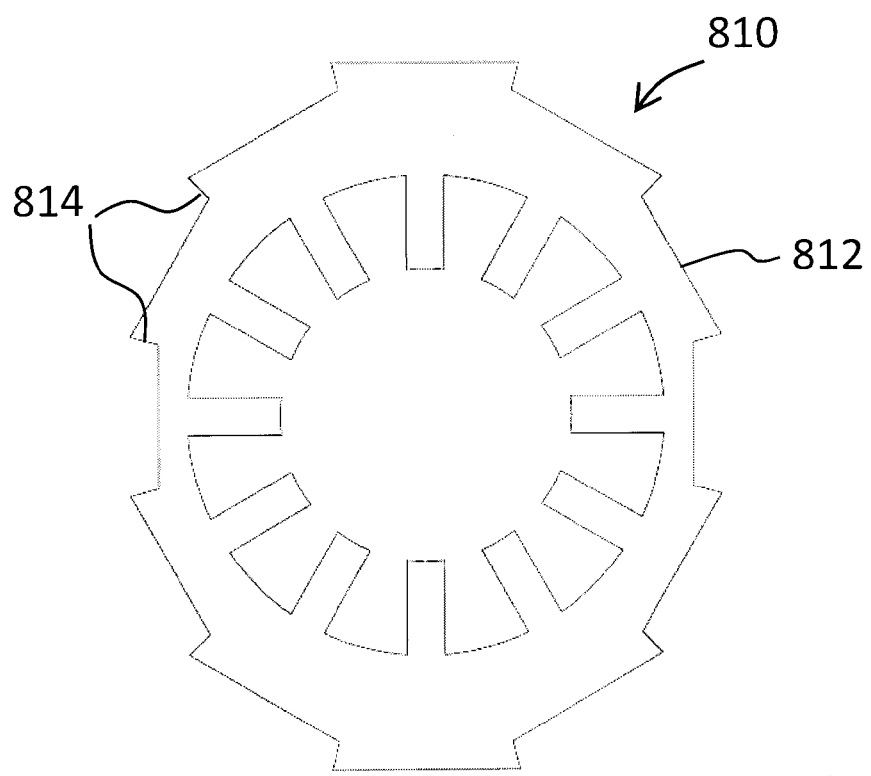
FIG. 8 shows an alternative lamination.

FIG. 8 describes yet another lamination 810 which has a polygonal outer circumferential edge made from a series of straight sections 812 rather than curved arcuate sections. The straight sections 812 can be thought of as being the chord of the arc which separate the various sections, wherein each chordal section is distinguished by a step 814. It will be appreciated that other polygonal forms could be used such as generally hexagonal or square laminations.

The laminations and housings described above may be made from any suitable material such as iron or steel. Typically, it is envisaged that the invention would be utilised on machines of 15 kW or above, or in high temperature environments which exceed 350° C. Such an application may include within the engine core of a gas turbine engine.

The dimensions of the laminations may be between 200 mm and 300 mm in diameter. The inner radius of curvature may be 70% to 80% of the outer radius of curvature. The steps in the outer circumference may be in the range of 2 to 4. There may be between one and four different radiuses of curvature. The thickness of the laminations may be between 0.15 mm and 0.2 mm. The inlets may be between 70% and 100% of the axial length of the laminated core. In some embodiments, the inlets may be between 95% to 100% of the axial length of the laminated core. It will be appreciated that 100% may not include the sealing end plate laminations as described above.

The embodiments described above relate to stators having twelve salient poles, or teeth. It will be apparent to the skilled person that as the number of teeth change, the number of steps in the circumference that can be used may also change. The angle of transposition for successive laminations will normally tend to be an integer which is a multiple of the angle between the stator teeth (which is α in the above described embodiments) such that all the teeth in the laminated stack are aligned. Thus, the greater the number of stator teeth present in the lamination, the higher the number of steps that can be used on the radially outer circumferential edge of the lamination.

The inlets should ideally take up 100% of the core axial length to ensure that there is maximum airflow in all the channels. As the individual cooling channels are taken from a helical structure there may be multiple combinations of inlet and outlet schemes that can be used. The inlet and outlet structure described in the Figures above represent only some of the possible configurations. Reducing the path length is particularly advantageous as reduces the pressure drop experienced along the path.

It will be appreciated that the invention is defined by the scope of the appended claims and that the illustrative examples provided above are not limiting.

The invention claimed is:

1. A laminated core for an electrical machine, comprising:
a plurality of laminations each having a radially outer edge defined by at least a first, a second and a third radius, each of the first, second and third radii being different sizes, wherein the first, second and third radii are separated by a step so as to provide circumferential projections which subtend about an angle and which change from one circumferential projection to an adjacent circumferential projection by a step,
wherein the plurality of laminations are configured such that the first, second and third radii define a helical channel in a surface of the laminated core for a flow of a cooling fluid, the channel has a base defined by the first radius, and at least one circumferential side wall having a radial height defined by the third radius and formed by the second radius of one of the plurality of laminations, wherein the second radius is greater than the first radius and less than the third radius.

2. The laminated core as claimed in claim 1, wherein the channel includes an imaginary axis extending from the base into the channel and the width of the channel increases along the length of the axis due to the stepped side wall.

3. The laminated core as claimed in claim 1, wherein each circumferential projection extends about an angle alpha or multiple thereof.

4. The laminated core as claimed in claim 1, wherein each lamination includes an inner projection and an outer projection and at least two intermediate projections therebetween.

5. The laminated core as claimed in claim 1, wherein the laminations have at least two fold rotational symmetry.

6. The laminated core as claimed in claim 1, wherein the channel is formed by a plurality of identical laminations and adjacent laminations are rotationally offset to one another.

7. The laminated core as claimed in claim 6, wherein the rotational offset between adjacent laminations is between 15 degrees and 90 degrees.

8. The laminated core as claimed in claim 1, wherein the plurality of laminations form a plurality of channels, wherein the channels extend around a circumference of the laminated core between an inlet and an outlet so as to provide parallel circumferential flow paths for a coolant when in use.

9. The laminated core as claimed in claim 8, wherein the plurality of circumferential channels are sections of a helical channel.

10. The laminated core as claimed in claim 9, wherein an outer surface includes two or more helical channels.

11. The laminated core as claimed in claim 8, wherein the inlets of each circumferential channel are arranged along a common axis.

12. The laminated core as claimed in claim 1, wherein the laminations are substantially polygonal and the radially outer edge of the circumferential projections are straight.

13. The laminated core as claimed in claim 1, further comprising a housing, wherein the housing has a surface which forms part of the channel or channels.

14. The laminated core as claimed in claim 13, wherein the housing includes at least one aperture which traverses several channels so as to provide the inlet for each channel.

15. The laminated core as claimed in claim 1, wherein the channels are in fluid communication with each other.

16. A lamination for an electrical machine, comprising:
a radially outer edge having a stepped profile to define an inner edge surface, an intermediate edge surface and an outer edge surface,
wherein the inner edge surface, intermediate edge surface and outer edge surface are separated by a step and the outer edge surface is adjacent to the intermediate edge surface on both circumferential sides of the outer edge surface, and
wherein the intermediate edge has a radius that is greater than a radius of the inner edge surface and less than a radius of the outer edge surface.

17. The lamination as claimed in claim 16, wherein each of the outer edge surface, intermediate edge surface and inner edge surface subtend around an angle alpha or multiple thereof.

* * * * *